US008260469B2

(12) United States Patent
Gregory et al.

(10) Patent No.: US 8,260,469 B2
(45) Date of Patent: Sep. 4, 2012

(54) DISTRIBUTED HYBRID RENEWABLE ENERGY POWER PLANT AND METHODS, SYSTEMS, AND COMPTUER READABLE MEDIA FOR CONTROLLING A DISTRIBUTED HYBRID RENEWABLE ENERGY POWER PLANT

(75) Inventors: Daniel Constantine Gregory, Chapel Hill, NC (US); Lawrence H. Alesi, Chapel Hill, NC (US); J. Adam Crain, Durham, NC (US)

(73) Assignee: Green Energy Corporation, Denver, CO (US)

( * ) Notice: Subject to any disclaimer, the term of this patent is extended or adjusted under 35 U.S.C. 154(b) by 242 days.

(21) Appl. No.: 12/612,530

(22) Filed: Nov. 4, 2009

(65) Prior Publication Data

US 2010/0145532 A1    Jun. 10, 2010

Related U.S. Application Data

(60) Provisional application No. 61/111,244, filed on Nov. 4, 2008.

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G08B 21/00 | (2006.01) |
| F03D 9/00 | (2006.01) |
| H02P 9/04 | (2006.01) |

(52) U.S. Cl. ........... 700/287; 700/297; 340/635; 290/44
(58) Field of Classification Search .................. 700/286, 700/287, 291, 297; 705/7.11, 7.12, 7.22, 705/7.25, 7.36–7.38; 290/43, 44; 340/500, 340/540, 635
See application file for complete search history.

(56) References Cited

U.S. PATENT DOCUMENTS

| 6,891,478 B2 * | 5/2005 | Gardner .................. 340/635 |
| 7,199,482 B2 * | 4/2007 | Hopewell .................. 290/44 |
| 7,391,126 B2 * | 6/2008 | Liu et al. .................. 290/44 |

(Continued)

OTHER PUBLICATIONS

Vineel et al., "A System for Real-Time Delivery of Wind Farm Production Forecasts", IEEE International Symposium on Industrial Electronics, 2007, pp. 1933-1937.*

(Continued)

*Primary Examiner* — Crystal J Barnes-Bullock
(74) *Attorney, Agent, or Firm* — Jenkins, Wilson, Taylor & Hunt, P.A.

(57) ABSTRACT

The subject matter described herein includes a distributed hybrid renewable energy power plant. One exemplary hybrid renewable energy power plant includes a plurality of renewable energy power generation sources that are distributed over a geographic area. A plurality of grid interface boxes connect each of the renewable energy power generation sources to a power distribution grid, measure power output by each of the renewable energy power generation sources, and regulate power delivered to the grid by each of the renewable energy power generation sources. A plant front end communicates with the grid interface boxes, determines a total output power available from the renewable energy power generation sources based on instantaneous power available from each of the renewable energy power generation sources, determines a statistical availability of the total output power based on weather and other conditions affecting power output from the renewable energy power generation sources, and outputs the total output power and the statistical availability to an energy management system.

22 Claims, 2 Drawing Sheets

U.S. PATENT DOCUMENTS

| | | | |
|---|---|---|---|
| 7,432,686 B2 * | 10/2008 | Erdman et al. | 322/44 |
| 7,844,370 B2 * | 11/2010 | Pollack et al. | 700/291 |
| 2007/0100506 A1 * | 5/2007 | Teichmann | 700/297 |
| 2008/0033786 A1 * | 2/2008 | Boaz et al. | 705/10 |
| 2008/0195255 A1 * | 8/2008 | Lutze et al. | 700/291 |
| 2009/0062967 A1 | 3/2009 | Kressner et al. | |
| 2009/0062969 A1 | 3/2009 | Chandra et al. | |
| 2009/0160187 A1 * | 6/2009 | Scholte-Wassink | 290/44 |
| 2009/0210269 A1 * | 8/2009 | Sade | 705/7 |
| 2009/0210329 A1 * | 8/2009 | Sade | 705/30 |
| 2009/0216387 A1 | 8/2009 | Klein | |
| 2010/0249955 A1 * | 9/2010 | Sitton | 700/33 |

OTHER PUBLICATIONS

Le Xie et al., "Model predictive economic/environmental dispatch of power systems with intermittent resources", IEEE Power & Energy Society General Meeting, 2009, pp. 1-6.*

Burke et al., "Optimal Wind Power Location on Transmission Systems—A Probabilistic Load Flow Approach", Proceedings of the 10th International Conference on Probabilistic Methods Applied to Power Systems, 2008, pp. 1-8.*

Muljadi et al., "Validation of wind power plant models", IEEE Power and Energy Society General Meeting—Conversion and Delivery of Electrical Energy in the 21st Century, 2008, pp. 1-7.*

Ramezani et al., "Modeling and Evaluation of Wind Turbines on Total Transfer Capability", IEEE Power Engineering Society General Meeting, 2007, pp. 1-6.*

Arita et al., "Evaluation of Battery System for Frequency Control in Interconnected Power System with a Large Penetration of Wind Power Generation", International Conference on Power System Technology, 2006, pp. 1-7.*

Caldon et al., "Optimisation algorithm for a virtual power plant operation", 39th International Universities Power Engineering Conference, vol. 3, 2004, pp. 1058-1062.*

"Open Secure Energy Control Systems," http://www.osecs.com, publication date unkown, downloaded Nov. 4, 2009.

Klein, "Roadmap to Secure Control Systems in the Energy Sector," ieRoadmap Workshop, PowerPoint Presentation (May 28-29, 2008).

* cited by examiner

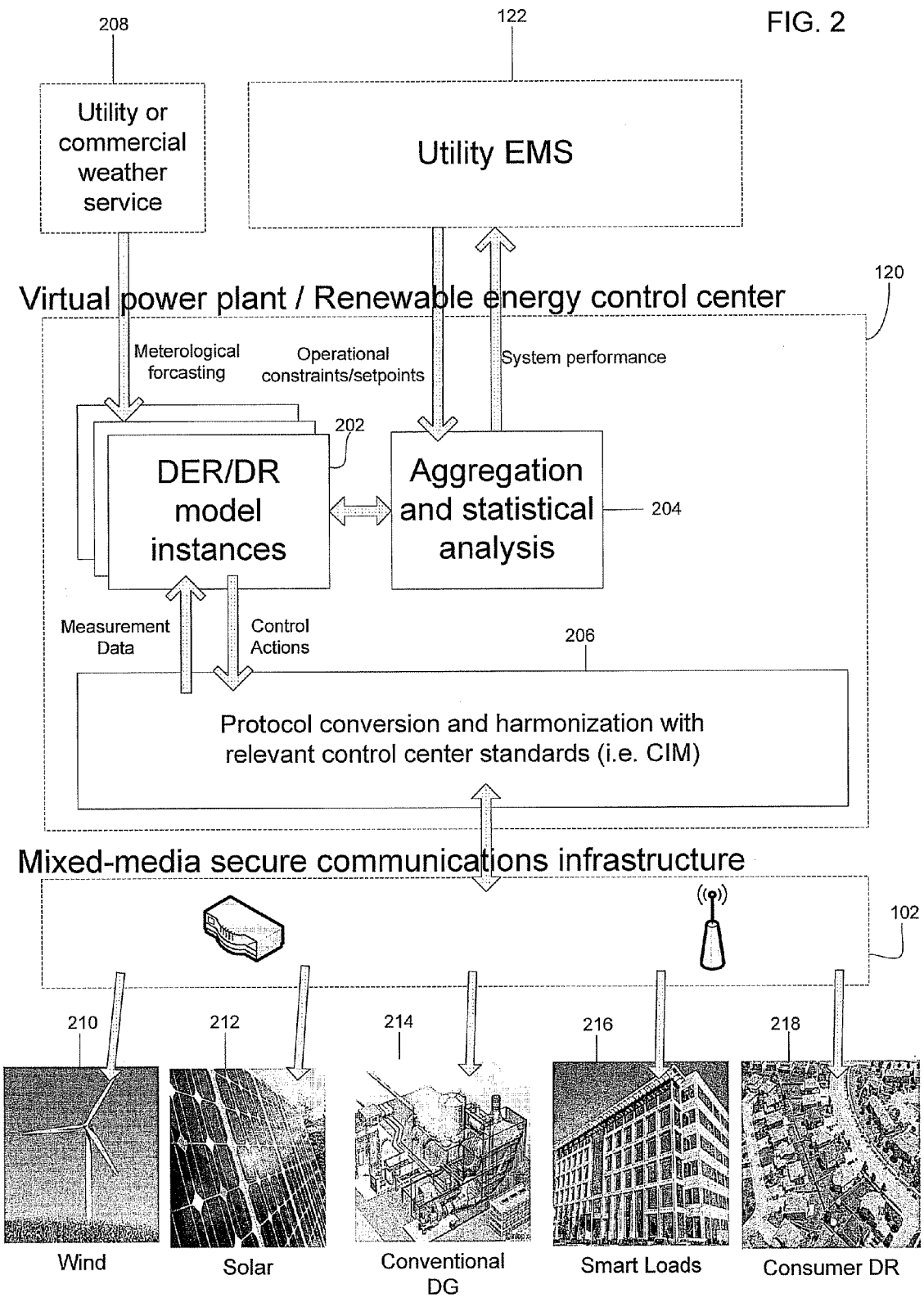

DISTRIBUTED HYBRID RENEWABLE ENERGY POWER PLANT AND METHODS, SYSTEMS, AND COMPTUER READABLE MEDIA FOR CONTROLLING A DISTRIBUTED HYBRID RENEWABLE ENERGY POWER PLANT

PRIORITY CLAIM

This application claims the benefit of U.S. Provisional Patent Application No. 61/111,244, filed on Nov. 4, 2008, the disclosure of which is incorporated herein by reference in its entirety.

TECHNICAL FIELD

The subject matter described herein relates to generating power using renewable energy sources. More particularly, the subject matter described herein relates to a distributed hybrid renewable energy power plant that aggregates power from geographically distributed renewable sources. The subject matter described herein also relates to a controller for aggregating, controlling, and delivering power from distributed hybrid renewable energy power sources.

BACKGROUND

Electric generation from renewable energy resources, such as wind and solar farms, is intermittent and unpredictable. The electric grid is designed to connect to available and predictable power plants and is negatively affected by intermittent generation.

The typical 12 kV electric distribution circuit is capable of accepting < or =1 MW of electric generation without infrastructure improvements and with minimal impact on electric system voltage and frequency. Connecting medium-scale (>1 MW) electric power plants to the electric distribution system or electric transmission system risks grid stability. For example, a 14 MW solar power plant located in Arizona is causing fluctuations in system frequency and voltage when clouds pass over the site. This has caused numerous problems with the connected utility grid.

More generally, if the output of a renewable energy power plant is greater than 10% of the line capacity, temporary unavailability can adversely affect power grid stability. As a result, current renewable energy power plants that are operated independently supply only a small percentage of line capacity and do not provide a significant portion of power consumed by a utility company's customers.

Accordingly, in light of these difficulties, there exists a need for a distributed hybrid renewable energy power plant.

SUMMARY

The subject matter described herein includes a distributed hybrid renewable energy power plant. One exemplary hybrid renewable energy power plant includes a plurality of renewable energy power generation sources that are distributed over a geographic area. A plurality of grid interface boxes connect each of the renewable energy power generation sources to a power distribution grid, measure power output by each of the renewable energy power generation sources, and regulate power delivered to the grid by each of the renewable energy power generation sources. A plant front end communicates with the grid interface boxes, determines a total output power available from the renewable energy power generation sources based on instantaneous power available from each of the renewable energy power generation sources, determines a statistical availability of the total output power based on weather and other conditions affecting power output from the renewable energy power generation sources, and outputs the total output power and the statistical availability to an energy management system.

The subject matter described herein for providing a distributed hybrid renewable energy power plant may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps.

Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. At least a portion of any of the modules, model instances, engines, etc. described herein may be implemented in hardware.

BRIEF DESCRIPTION OF THE DRAWINGS

Preferred embodiments of the subject matter described herein will now be explained with reference to the accompanying drawings of which:

FIG. 2 is a block diagram of a distributed hybrid renewable power plant according to an embodiment of the subject matter described herein.

DETAILED DESCRIPTION

Figure 1:
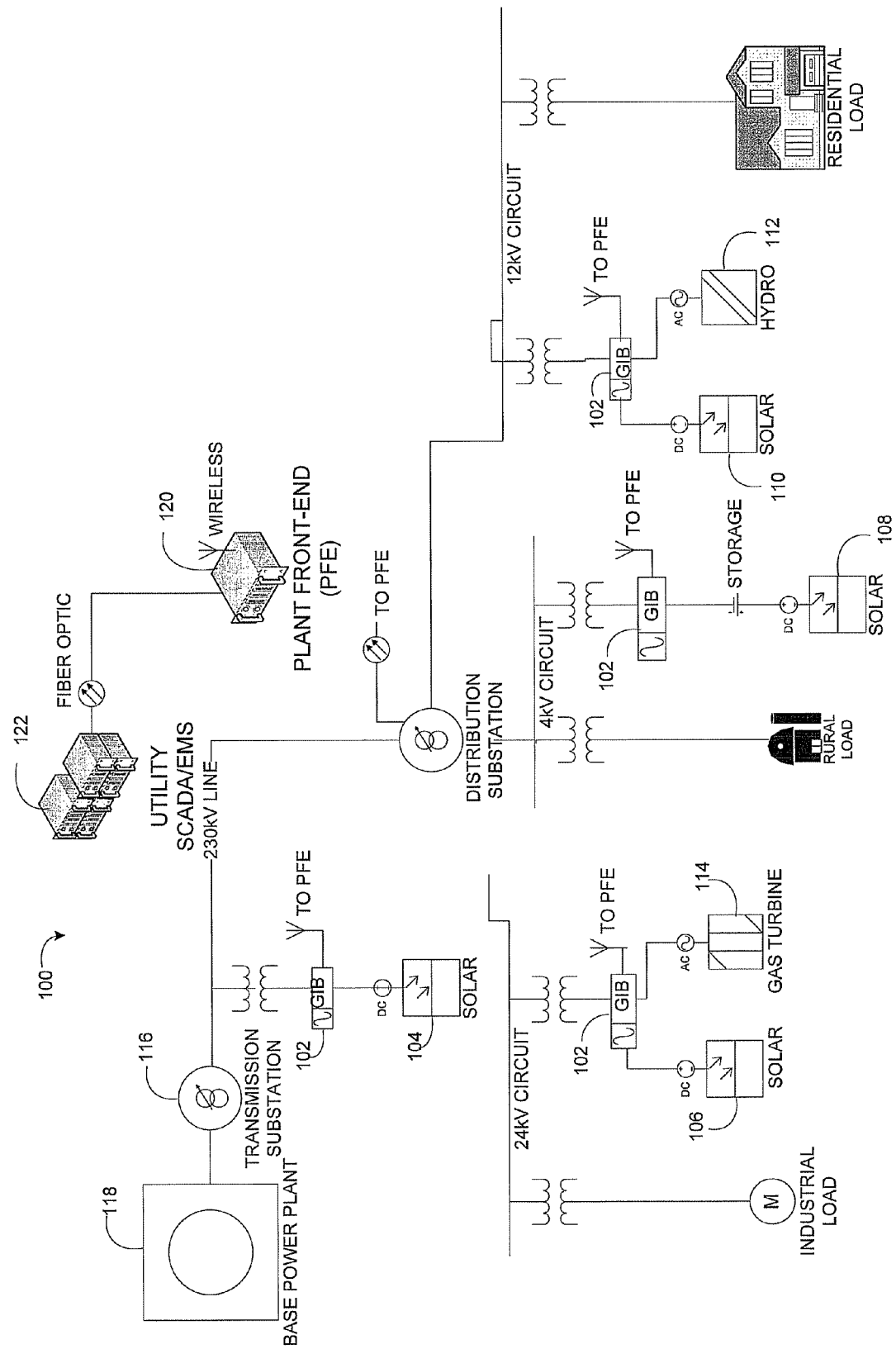
FIG. 1 is a schematic diagram of a distributed hybrid renewable power plant according to an embodiment of the subject matter described herein.

The subject matter described herein includes a distributed hybrid renewable energy power plant, i.e., a virtual power plant (VPP). A VPP may aggregate and manage geographically distributed energy resources (DER), large smart loads, and consumer level demand response (DR) using an advanced meter infrastructure (AMI). The renewable energy resources include, but are not limited to, wind power, solar power, biomass power, and power from conventional distributed generation (DG). As previously mentioned, renewable energy resources are typically too small or too unpredictable for utilities to rely upon for base power generation. Due to the statistics of larger numbers of resources, geographical distribution, and careful modeling of each type of resource, a VPP or distributed hybrid renewable energy power plant may be used to approximate the behavior of a conventional coal or nuclear power plant.

FIG. 1 is a schematic diagram of a distributed hybrid renewable power plant in accordance with an embodiment of the subject matter described herein. Referring to FIG. 1, power plant 100 includes a plurality of renewable energy power sources (i.e., power generation sources, or distributed energy resources) connected to distribution system via grid interface boxes (GIBs) 102. In the illustrated example, power plant 100 includes solar power generation sources 104, 106, 108, and 110, hydroelectric power generation source 112, and gas turbine power generation source 114. Although FIG. 1 only depicts solar power generation sources 104, 106, 108, and 110, hydroelectric power generation source 112, and gas turbine power generation sources 114, other types of renewable power sources (e.g., wind, biomass, etc.) may be used without departing from the scope of the present subject matter. In one embodiment, solar power generation sources 104, 106, 108, and 110 are geographically distributed so that weather conditions affecting the output of one source may not affect another source.

An example of solar power generation sources 104, 106, 108, 110 includes a farm of concentrating solar units of the type described in U.S. patent application publication number 20080023061, assigned to Megawatt Solar, Inc., the disclosure of which is incorporated herein by reference in its entirety.

In the example illustrated in FIG. 1, each power generation source under a common grid interface box preferably supplies no more than 10% of the line capacity. For the 230 kV line connected to transition substation 116 and base power plant 118, each of the renewable energy generation sources preferably supplies no more than 10% of the maximum power line rating to which it is connected.

In one embodiment, each grid interface box 102 is an electronic system that incorporates protective relaying, metering, control, inversion, and communications. Grid interface boxes may be distributed over a wide geographic region to minimize weather impact and grid disturbances. Grid interface boxes 102 may generate alarms, measure instantaneous power output of each power generation source, and communicate this information to a centralized location, such as plant front end 120.

In one embodiment, plant front end 120 receives the power measurements, alarms, and other data from grid interface boxes 102, receives weather and other data that may affect power output from each power generation source, and outputs a value representing the total power output from the energy sources under each of the grid interface boxes and a statistical availability. In order to determine the total power output by the renewable energy sources, plant front end 120 may simply sum the total instantaneous power measurements from grid interface boxes 102. In order to determine the statistical availability, plant front end 120 may take into account weather data received from an Internet or other weather data source and determine a percentage of certainty that the power currently being delivered will continue over a time period. Plant front end 120 may also take into account alarm data when determining the statistical availability.

In one example, plant front end 120 may receive weather data indicating that a microstorm will reduce the output from solar energy source 106 by 80% for the next two hours. If each power generation source 104-114 is a 1 MW source, the total instantaneous power output may normally be 6 MW. Since solar energy source 106 is only available at 20% of its current power output for the next two hours, plant front end 120 may calculate the total power output by the virtual power plant formed by the grid interface boxes 102 to be 5.2 MW. The statistical availability of 5.2 MW may be calculated based on alarm and measurement data from grid interface boxes 102. For example, if no alarms are present and each energy source is operating at its historical average power output, the statistical availability calculated by plant front end 120 may be close to 100%. On the other hand, if alarms are present from one or more grid interface boxes indicating problems with plant operation, the statistical availability may be reduced by an amount dependent on the nature of the alarms. Further, if power output from one of the power generation sources has dropped steeply from its average value, the statistical availability of that source may also be reduced. The plant front end algorithm is based on Bayes' Theorem of conditional probabilities.

The general idea of estimating the statistical availability of a power generation source is to estimate the probability density function (PDF) P(X) at a given instant in time where P is the probability of a resource being able to generate X amount of instantaneous power. A technique that can be employed to estimate the PDF is known as Recursive Bayesian estimation, of which Kalman Filtering is a special case:

http://en.wikipedia.org/wiki/Recursive_Bayesian estimation

In the case of a solar farm, the inputs to the process being modeled would include, but are not limited to:

1) Local environmentals—humidity, temp, wind, etc. at plant

2) Proximate environmentals—doppler, etc. from external sources

3) Plant diagnostics—unit availability, inverter loading, etc at the plant

4) Grid diagnostics—circuit loading, outages, etc. from external sources

It is assumed in the modeling of these systems that the probability density for the next iteration is a function of the previous iteration and the latest measurements. That is, a history of all measurements and previous PDF estimations are not required.

Plant front end 120 may provide the statistical availability and power output measurements to a utility company's energy management system (EMS) 122. Communication between plant front end 120 and EMS 122 may occur using any suitable protocol, such as Distributed Network Protocol (DNP) 3.0 or International Electromechanical Commission (IEC) 61850. EMS 122 may use the statistical availability measurement to determine whether to supplement power from power plant 100 with a supplemental source, such as pump storage. In hydroelectric power plants, pump storage refers to potential power output that is available due to water that was pumped into a reservoir that feeds a dam during time when surplus power is available. This pumped water may be used to spin the turbines and produce supplemental energy when needed.

As described above, geographically dispersing small generators (e.g., wind, solar, biomass, hydroelectric, etc.) over a wide area and aggregating the resources into a single power plant using wide-area communications and a Supervisory Control And Data Acquisition (SCADA) system or distributed control system can result in a power plant with a statistical availability that minimizes the likelihood of disruption of the power grid. Using weather pattern modeling, diagnostics information, and real-time power data, a statistical model can be applied to ensure a specific availability of the aggregated resources. This architecture ensures that poor wind conditions, localized storms, or low-level cloud passes only will impact a fraction of the overall power plant. Electric grid voltage and frequency is not affected by these small generators' intermittency and overall power plant availability is predictable.

FIG. 2 is a block diagram that further illustrates the interaction of the elements in power plant 100. For example, plant front end 120 is depicted as including a plurality of distributed energy resources (DER)/demand response (DR) model instances 202, an aggregation and statistical analysis engine 204 (i.e., an aggregation engine), and a protocol conversion module 206. Although not depicted in FIG. 2, plant front end 120 may include a controller that is configured to coordinate and control the modules in plant front end 120. In one embodiment, DER/DR model instances 204 include a plurality of model instances that represent various renewable energy power generation sources and the like. For example, a model may generally be described as a mathematical construct that maps input data to output data and attempts to approximate a real world process. In one embodiment, the model instances included in DER/DR model instances 204 may be mathematical representations of the distributed energy resources and consumer level demand response (see below). The mathematical representations may include the properties and methods performed by the distributed energy resources. For example, a model (M) for a wind farm may be characterized by inputs (x), such as the number of operational turbines, the power production characteristics of each turbine or class of turbine with respect to wind velocity, the status of all equipment critical to operation (i.e. inverters, breakers, etc.), and the statistical distribution of expected wind flows over a period of time. The output (Y) of the model may represent, for example, the statistical distribution of expected power generation over a period of time. Thus, the model (M) may be represented as Y=M(x). In one embodiment, DER/DR model instances 204 may also utilize industry standards component models, such as those specified in IEC 61850, in a model instance.

As shown in FIG. 2, DER/DR model instances 202 receive measurement data from a protocol conversion module 206 and obtains meteorological forecasting data from a weather service entity 208 (e.g., via the Internet). DER/DR model instances 202 may then apply the acquired input data to one or more of the models and subsequently provide its output data to an aggregation statistical and analysis engine 204. In one embodiment, aggregation and statistical analysis engine 204 is configured for receiving data from DER/DR model instances 202 and for performing statistical analysis using the data to determine the performance of the power plant system. Aggregation and statistical analysis engine 204 is also configured to send system performance data (e.g., power output measurements and statistical availability data) to EMS 122. Aggregation and statistical analysis engine 204 is also configured to receive operational constraints and setpoints sent from EMS 122 and may use this data in the statistical analysis processes. Exemplary statistical analysis that may be performed by aggregation and statistical analysis engine 204 include the above-described recursive Bayesian estimation techniques. The output from aggregation and statistical analysis engine 204 may be a total aggregated power output from the distributed hybrid renewable energy sources and a statistical availability of the total output power, as in the example described above.

In one embodiment, protocol conversion module 206 provides an interface between plant front end 120 and the GIBs 102. GIBs 102 communicate with a plurality of geographically distributed energy resource units, such as a wind power generation source unit 210, a solar power generation source unit 212, a conventional distributed generation unit 214, a smart load unit 216, and consumer level demand response 218. Notably, units 210-214 are energy producing units that are similar to the aforementioned power generation sources disclosed above. However, smart load unit 216 and consumer level demand response unit 218 are load units that effectively act as "negative sources", since these units consume power as opposed to generating power. For example, smart load unit 216 may comprise a plurality of loads that is efficiently managed by a coordinating unit that manages and attempts to minimize the cumulative power demand of the associated loads. Similarly, consumer level demand response 218 may be embodied as a system that uses advanced meter infrastructure (AMI) to minimize the cumulative power demands from a plurality of consumers. In one embodiment, consumer level demand response unit 218 may employ an electric load control program that monitors and manages load in the most efficient manner, such as utilizing electric load aggregation techniques.

A geographically dispersed and hybrid electric power generation plant can be designed to ensure predicable availability and minimal, if any, power grid instability. Further, through careful planning, it is possible to deploy a power plant that offers unprecedented availability, even during extreme weather conditions.

It will be understood that various details of the subject matter described herein may be changed without departing from the scope of the subject matter described herein. Furthermore, the foregoing description is for the purpose of illustration only, and not for the purpose of limitation.

What is claimed is:

1. A geographically distributed and hybrid renewable energy power plant, the power plant comprising:
   a plurality of renewable energy power generation sources that are distributed over a geographic area;
   a plurality of grid interface boxes, wherein each of the grid interface boxes is respectively configured to connect one renewable energy power generation source of the renewable energy power generation sources to a power distribution grid, to measure a power output by the one renewable energy power generation source, and to regulate power delivered to the power distribution grid by the one renewable energy power generation source; and
   a plant front end for communicating with the grid interface boxes, for determining a total output power available from the renewable energy power generation sources based on instantaneous power available from each of the renewable energy power generation sources, for determining a statistical availability of the total output power based on weather and other conditions affecting power output from the renewable energy power generations sources, and for outputting the total output power and the statistical availability to an energy management system.

2. The power plant of claim 1 wherein power output from each of the renewable energy power generation sources is no more than about ten percent of maximum power distribution line capacity.

3. The power plant of claim 1 wherein the statistical availability is determined using recursive Bayesian estimation.

4. The power plant of claim 1 wherein the plurality of grid interface boxes is further configured to generate alarms, measure instantaneous power output of each of the plurality of renewable energy power generation sources, and communicate the measured instantaneous power output to the plant front end.

5. The power plant of claim 1 wherein the statistical availability is calculated based on alarm data and measurement data from the plurality of grid interface boxes.

6. The power plant of claim 1 wherein the statistical availability is determined based on weather data.

7. The power plant of claim 1 wherein the renewable energy power generation sources include at least one of a solar power generation source, a wind power generation source, a hydroelectric power generation source, and a biomass power generation source.

8. A system for controlling a distributed hybrid renewable energy power plant, comprising:

a plurality of grid interface boxes, wherein each of the grid interface boxes is respectively configured to connect one energy resource belonging to a plurality of distributed energy resources to a power distribution grid, to measured power output from the one energy resource, and to regulate the measured power output by the energy resource to be delivered to the power distribution grid; and a plant front end comprising:
- a protocol conversion module for receiving, from the plurality of grid interface boxes, inputs indicating the measured power output;
- a plurality of model instances for modeling the statistical availability of each of the plurality of distributed energy resources; and
- an aggregation engine for aggregating the measured power outputs and statistical availabilities, and for presenting the aggregated power outputs and statistical availabilities as an aggregated distributed energy resource to a utility energy management system (EMS).

9. The system of claim 8 wherein power output from each of the plurality of distributed energy resources is no more than about ten percent of maximum power distribution line capacity.

10. The system of claim 8 wherein the statistical availability is determined using recursive Bayesian estimation.

11. The system of claim 8 wherein the plurality of grid interface boxes is further configured to generate alarms, measure instantaneous power output of each of the plurality of renewable energy power generation sources, and communicate the measured instantaneous power output to the plant front end.

12. The system of claim 8 wherein the statistical availability is calculated based on alarm data and measurement data from the plurality of grid interface boxes.

13. The system of claim 8 wherein the statistical availability is calculated based on weather data.

14. The system of claim 8 wherein the distributed energy resources include at least one of a solar power generation source, a wind power generation source, a hydroelectric power generation source, and a biomass power generation source.

15. The system of claim 8 wherein the plurality of model instances is further configured to receive meteorological forecast input from a weather service entity.

16. A method for controlling a distributed hybrid renewable energy power plant, comprising:
receiving inputs, from a plurality of grid interface boxes, indicating the measured power output originating from a plurality of distributed energy resources, wherein each of the grid interface boxes is respectively, configured to connect one energy resource of the plurality of distributed energy resources to a power distribution grid, to measure the power output by the one energy resource, and to regulate power delivered to the power distribution grid by the one energy resource;

modeling the statistical availability of each of the plurality of distributed energy resources;

aggregating the measured power outputs and statistical availabilities; and presenting the aggregated power outputs and statistical availabilities as an aggregated distributed energy resource to a utility energy management system (EMS).

17. The method of claim 16 wherein power output from each of the plurality of distributed energy resources is no more than about ten percent of maximum power distribution line capacity.

18. The method of claim 16 wherein modeling the statistical availability includes determining the statistical availability using recursive Bayesian estimation.

19. The method of claim 16 wherein modeling the statistical availability includes calculating the statistical availability based on alarm data and measurement data from a plurality of grid interface boxes coupled to the plurality of distributed energy resources.

20. The method of claim 16 wherein modeling the statistical availability includes calculating the statistical availability based on weather data.

21. The method of claim 16 wherein the distributed energy resources include at least one of a solar power generation source, a wind power generation source, a hydroelectric power generation source, and a biomass power generation source.

22. A computer readable medium having stored thereon computer executable instructions that when executed by a processor of a computer control the computer to perform steps comprising:
receiving inputs, from a plurality of grid interface boxes, indicating the measured power output originating from a plurality of distributed energy resources, wherein each of the grid interface boxes is respectively configured to connect one energy resources of the plurality of distributed energy resources to a power distribution grid, to measure the power output by the one energy resource, and to regulate power delivered to the power distribution grid by the one energy resource;

modeling the statistical availability of each of the plurality of distributed energy resources;

aggregating the measured power outputs and statistical availabilities; and presenting the aggregated power outputs and statistical availabilities as an aggregated distributed energy resource to a utility energy management system (EMS).

* * * * *